United States Patent
Nakashima et al.

(10) Patent No.: US 10,569,414 B2
(45) Date of Patent: Feb. 25, 2020

(54) ROBOT CONTROL APPARATUS, ROBOT CONTROL METHOD, AND ROBOT CONTROL PROGRAM

(71) Applicant: OMRON Corporation, Kyoto-shi, Kyoto (JP)

(72) Inventors: Akane Nakashima, Nara (JP); Takeshi Kojima, Kyoto (JP); Kennosuke Hayashi, Kizugawa (JP); Haruka Fujii, Uji (JP)

(73) Assignee: OMRON Corporation, Kyoto-shi (JP)

( * ) Notice: Subject to any disclaimer, the term of this patent is extended or adjusted under 35 U.S.C. 154(b) by 2 days.

(21) Appl. No.: 16/012,813

(22) Filed: Jun. 20, 2018

(65) Prior Publication Data

US 2019/0039237 A1 Feb. 7, 2019

(30) Foreign Application Priority Data

Aug. 1, 2017 (JP) .................. 2017-149437

(51) Int. Cl.
*B25J 9/00* (2006.01)
*B25J 9/16* (2006.01)
(Continued)

(52) U.S. Cl.
CPC .......... *B25J 9/0093* (2013.01); *B25J 9/1664* (2013.01); *B25J 9/1669* (2013.01); *B25J 9/1697* (2013.01);
(Continued)

(58) Field of Classification Search
CPC ...... B25J 9/0093; B25J 9/1697; B25J 9/1664; B25J 9/1669; B65G 61/00; B65G 47/90;
(Continued)

(56) References Cited

U.S. PATENT DOCUMENTS 5,040,056 A * 8/1991 Sager .................... B25J 9/0093
348/88
8,290,624 B2 * 10/2012 Hjornet ............... B25J 15/0616
414/737

(Continued)

FOREIGN PATENT DOCUMENTS

| EP | 1886772 A1 | 2/2008 |
| JP | 2014-180704 A | 9/2014 |
| WO | 86/06050 A1 | 10/1986 |

OTHER PUBLICATIONS

Extended European search report dated Dec. 19, 2018 in a counterpart European patent application.

(Continued)

*Primary Examiner* — Jaime Figueroa
(74) *Attorney, Agent, or Firm* — Metrolex IP Law Group, PLLC

(57) ABSTRACT

A robot control apparatus includes a workpiece orientation calculation unit, an arrival prediction unit, a robot orientation calculation unit, and a trajectory data generation unit. The arrival prediction unit obtains a picking prediction position at which a workpiece that is conveyed by a conveyance apparatus may be picked up by a picking apparatus or the like, based on conveyance speed information supplied by the conveyance apparatus or the like and the sensing information supplied by an image acquisition apparatus.

15 Claims, 7 Drawing Sheets

(51) Int. Cl.
  *B65G 47/90* (2006.01)
  *B65G 61/00* (2006.01)
(52) U.S. Cl.
  CPC ............ *B65G 47/90* (2013.01); *B65G 61/00* (2013.01); *B65G 2203/041* (2013.01); *G05B 2219/37555* (2013.01); *G05B 2219/39106* (2013.01); *G05B 2219/40007* (2013.01); *G05B 2219/40022* (2013.01); *G05B 2219/40053* (2013.01); *G05B 2219/40554* (2013.01)
(58) Field of Classification Search
  CPC .... B65G 2203/041; G05B 2219/40554; G05B 2219/40022; G05B 2219/40007; G05B 2219/39106; G05B 2219/40053
  USPC ......................................................... 700/245
  See application file for complete search history.

(56) References Cited

U.S. PATENT DOCUMENTS

| | | | | |
|---|---|---|---|---|
| 9,102,053 | B2* | 8/2015 | Suzuki | B25J 9/1612 |
| 9,289,897 | B2* | 3/2016 | Mattern | B25J 9/1612 |
| 9,457,970 | B1* | 10/2016 | Zevenbergen | B65G 67/02 |
| 9,486,921 | B1* | 11/2016 | Straszheim | B25J 9/1679 |
| 9,782,896 | B2* | 10/2017 | Terada | B25J 9/1656 |
| 9,925,663 | B2* | 3/2018 | Vance | B25J 9/1664 |
| 10,350,755 | B2* | 7/2019 | Wagner | B25J 9/1664 |
| 2010/0106297 | A1* | 4/2010 | Inazumi | G01S 5/186 |
| | | | | 700/245 |
| 2012/0229620 | A1* | 9/2012 | Ikeda | B25J 9/1697 |
| | | | | 348/94 |
| 2012/0236140 | A1* | 9/2012 | Hazeyama | B25J 9/1697 |
| | | | | 348/94 |
| 2012/0296474 | A1* | 11/2012 | Irie | B25J 9/1687 |
| | | | | 700/259 |
| 2013/0141570 | A1* | 6/2013 | Saruta | G06K 9/78 |
| | | | | 348/135 |
| 2013/0166061 | A1* | 6/2013 | Yamamoto | B25J 9/1664 |
| | | | | 700/214 |
| 2014/0023461 | A1* | 1/2014 | Schaller | H01L 21/67742 |
| | | | | 414/222.07 |
| 2014/0277731 | A1 | 9/2014 | Kamiya et al. | |
| 2014/0365009 | A1* | 12/2014 | Wettels | B25J 9/1612 |
| | | | | 700/258 |
| 2016/0151916 | A1* | 6/2016 | Kanno | B25J 9/1697 |
| | | | | 700/228 |
| 2016/0368106 | A1* | 12/2016 | Koscielski | B23K 11/115 |
| 2017/0075331 | A1* | 3/2017 | Kapoor | G05B 19/0426 |
| 2017/0136632 | A1* | 5/2017 | Wagner | B25J 9/1697 |
| 2017/0236262 | A1* | 8/2017 | Ohnuki | G06T 7/74 |
| | | | | 700/30 |
| 2017/0274553 | A1* | 9/2017 | Martinez | B23Q 7/02 |
| 2018/0050451 | A1* | 2/2018 | Takanishi | B25J 9/1633 |

OTHER PUBLICATIONS

Extended European search report dated May 22, 2019 in a counterpart European patent application.

* cited by examiner

ROBOT CONTROL APPARATUS, ROBOT CONTROL METHOD, AND ROBOT CONTROL PROGRAM

CROSS-REFERENCES TO RELATED APPLICATIONS

This application claims priority to Japanese Patent Application No. 2017-149437 filed Aug. 1, 2017, the entire contents of which are incorporated herein by reference.

FIELD

The disclosure relates to a technique for controlling a robot configured to pick an object.

BACKGROUND

A so-called bin-picking system in which objects (also referred to as "workpieces" hereinafter) that are stacked disorderly in a stationary container are removed one by one using a robot hand and transferred to a predetermined location is known. In the bin-picking system, operations for measuring the position and the orientation of each workpiece, determining a workpiece that is to be removed next based on the measurement result, and gripping (that is, picking up) and transferring this workpiece using the robot hand are performed (see JP 2014-180704A, for example).

JP 2014-180704A is an example of background art.

SUMMARY

However, as described above, a conventional bin-picking system is preconditioned on a workpiece that is to be picked up and a container containing the workpieces are stationary. Thus, in order to pick up a workpiece that is conveyed by a conveyor or the like using a robot hand, it is necessary to stop the conveyor so as to stop the movement of the workpiece to be picked up each time, and there is a problem in that picking up of the workpieces using the robot hand took a huge amount of time.

One or more aspects have been made in light of the above-described circumstances, and an object thereof is to provide a technique for controlling a robot capable of performing picking up quickly.

A robot control apparatus according to one aspect is a robot control apparatus for controlling a robot configured to pick up a workpiece that is conveyed by a conveyance apparatus, the robot control apparatus including a workpiece orientation calculation unit configured to calculate an orientation of the workpiece based on sensing information of the workpiece that is output from a measurement apparatus, an arrival prediction unit configured to obtain a picking prediction position at which the workpiece that is being conveyed is predicted to be picked up by the robot, based on the sensing information of the workpiece and a conveyance speed of the conveyance apparatus, a robot orientation calculation unit configured to calculate an orientation at the picking prediction position of the robot based on the calculated orientation of the workpiece and the picking prediction position, and a trajectory data generation unit configured to acquire an orientation at an operation start position of the robot and generate trajectory data expressing an operation trajectory of the robot from the operation start position to the picking prediction position, based on the acquired orientation at the operation start position of the robot and the orientation at the picking prediction position of the robot.

According to the above-described configuration, the picking prediction position at which the workpiece that is being conveyed is predicted to be picked up by the robot is obtained based on the sensing information of the workpiece and the conveyance speed of the conveyance apparatus. Moreover, the trajectory data expressing the operation trajectory of this robot from the operation start position to the picking prediction position is generated based on the orientation at the operation start position of the robot and the orientation at the picking prediction position of the robot, and thus even when the workpiece to be picked up is conveyed, the picking up operation of the robot can be controlled with consideration for the movement of the workpiece due to conveyance from when the robot starts operation until when the robot picks up the workpiece. Accordingly, it is possible to realize a quick picking up operation compared to a conventional bin-picking system.

A robot control method according to another aspect is a robot control method for controlling a robot configured to pick up a workpiece that is conveyed by a conveyance apparatus, the robot control method including calculating an orientation of the workpiece based on sensing information of the workpiece that is output from a measurement apparatus, obtaining a picking prediction position at which the workpiece that is being conveyed is predicted to be picked up by the robot, based on the sensing information of the workpiece and a conveyance speed of the conveyance apparatus, calculating an orientation at the picking prediction position of the robot based on the calculated orientation of the workpiece and the picking prediction position, acquiring an orientation at an operation start position of the robot, and generating trajectory data expressing an operation trajectory of the robot from the operation start position to the picking prediction position, based on the acquired orientation at the operation start position of the robot and the orientation at the picking prediction position of the robot.

A program according to another aspect causes a computer configured to control a robot configured to pick up a workpiece that is conveyed by a conveyance apparatus to operate as a workpiece orientation calculation unit configured to calculate an orientation of the workpiece based on sensing information of the workpiece that is output from a measurement apparatus, an arrival prediction unit configured to obtain a picking prediction position at which the workpiece that is being conveyed is predicted to be picked up by the robot, based on the sensing information of the workpiece and a conveyance speed of the conveyance apparatus, a robot orientation calculation unit configured to calculate an orientation at the picking prediction position of the robot based on the calculated orientation of the workpiece and the picking prediction position, and a trajectory data generation unit configured to acquire an orientation at an operation start position of the robot and generate trajectory data expressing an operation trajectory of the robot from the operation start position to the picking prediction position, based on the acquired orientation at the operation start position of the robot and the orientation at the picking prediction position of the robot.

According to one or more aspects, it may be possible to provide a technique for controlling a robot capable of quickly picking up a workpiece that is conveyed, without stopping the workpiece.

DETAILED DESCRIPTION

Figure 1:
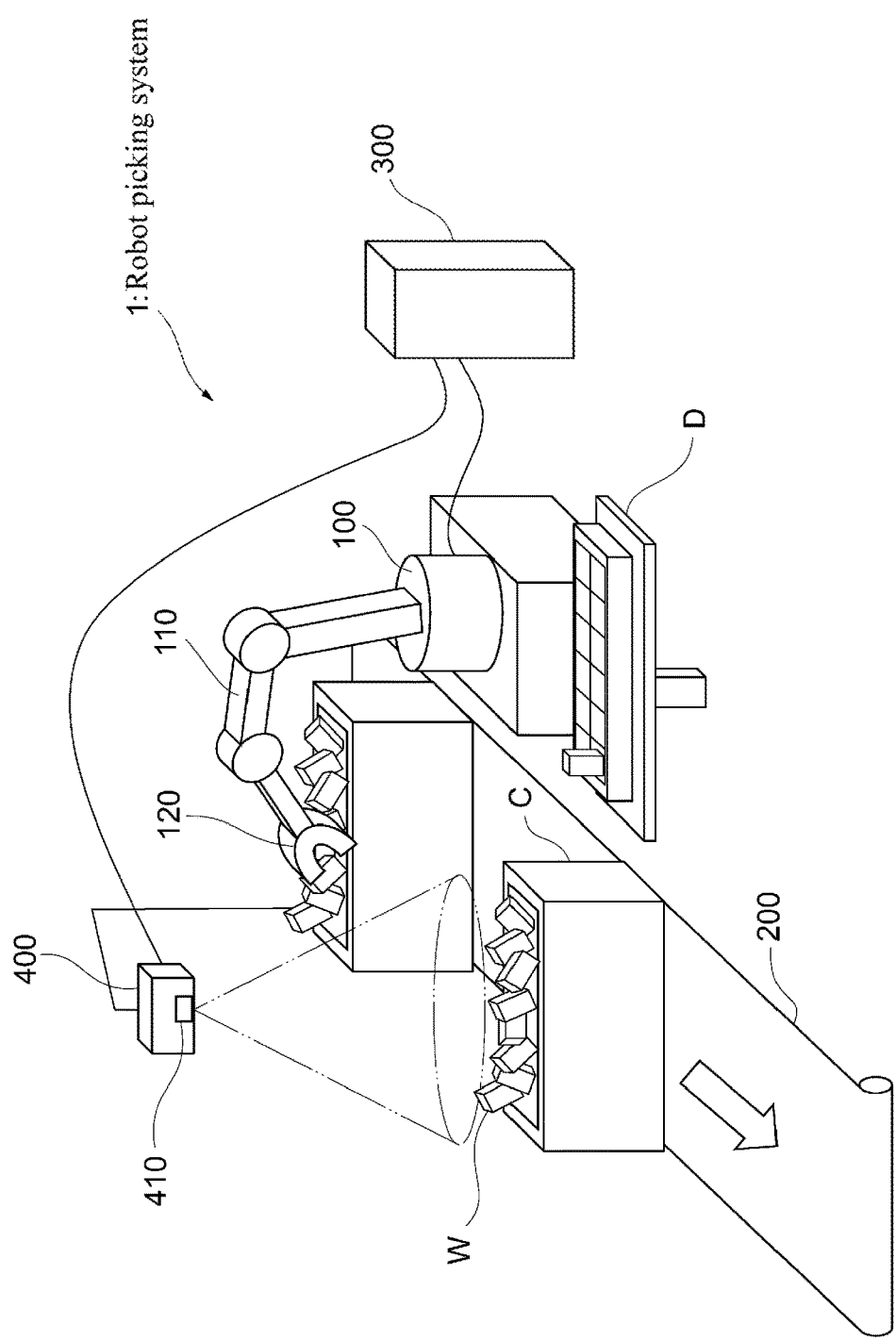
FIG. 1 is a diagram illustrating an overall configuration of a robot-picking system.

Hereinafter, embodiments will be described in detail with reference to the drawings. Note that the same constituent elements are denoted by the same reference numerals, and redundant description will be omitted. Also, the following embodiments are merely examples for illustrating the present invention, and it is not intended to limit the invention to only these embodiments. Various modifications can be made to the present invention without departing from the gist thereof.

A. Embodiment

A-1. Configuration
Robot-Picking System

FIG. 1 is a diagram showing a robot-picking system 1 of one or more embodiments. As shown in FIG. 1, in the robot-picking system 1, a robot 100 picks up, one by one, workpieces W in a case C that are conveyed by a conveyance apparatus 200, and transfers the workpieces W to a predetermined shelf D (or a conveyance apparatus or the like).

The conveyance apparatus 200 is various types of conveyor that are installed in a factory, for example, and a plurality of workpieces W accommodated in the case C are conveyed by the conveyance apparatus 200. In one or more embodiments, it is assumed that the plurality of workpieces W are conveyed in a state in which the workpieces W are stacked in bulk in the case C, but the plurality of workpieces W may be conveyed in a state in which the workpieces W are directly placed on the conveyor (that is, in a state in which the workpieces are not accommodated in the case C).

The workpieces W are various manufactured articles or processed objects such as metal components or food, for example. The workpieces W that are picked up by the robot 100 from the case C are transferred to predetermined positions on the shelf D, for example.

The robot-picking system 1 includes the robot 100 configured to pick up the workpieces W that are conveyed by the conveyance apparatus 200 from the case C and transfer the picked up workpieces W to the shelf D without stopping the workpieces W, a robot control apparatus 300 configured to control operation of the robot 100, and a workpiece measurement apparatus 400 configured to acquire images of the workpieces W and measure the orientations and the positions of the workpieces W.

Robot

The robot 100 is so-called a multi-jointed robot provided with an arm 110 and a picking apparatus (robot hand) 120. The robot 100 has a configuration with six degrees of freedom that are needed for operation in a three-dimensional space. Of course, it is not intended to limit the present invention to a robot with six degrees of freedom, and one or more embodiments may be applicable to a robot having a configuration with seven degrees of freedom, which are obtained by adding a redundant degree of freedom to the six degrees of freedom.

The picking apparatus 120 is attached to a distal end of the arm 110. The picking apparatus 120 according to one or more embodiments is a parallel hand, a multi-fingered hand, a multi-fingered, multi-jointed hand, or the like, for example, and the picking apparatus 120 holds the workpieces W by causing a plurality of members to perform an open and close operation. The open and close operation of the picking apparatus 120 is controlled in accordance with control signals supplied by the robot control apparatus 300.

Workpiece Measurement Apparatus

A workpiece measurement apparatus 400 outputs image data of the workpieces W to the robot control apparatus 300. Specifically, the workpiece measurement apparatus 400 includes an image acquisition apparatus 410 configured to acquire image data of the workpieces W, a CPU, memories such as a RAM and a ROM storing a control program executed by the CPU, a communication interface, and the like. The image acquisition apparatus 410 can use an image sensor, for example. By the CPU reading out the control program from the memory and executing the read control program, the workpiece measurement apparatus 400 outputs the image data of the workpieces W to the robot control apparatus 300 as sensing information via the communication interface.

Robot Control Apparatus

The robot control apparatus 300 supplies control signals to the robot 100, and thereby centrally controls the units of the robot 100. The robot control apparatus 300 is constituted by a computer that is bidirectionally communicably connected to the robot 100.

Figure 2:
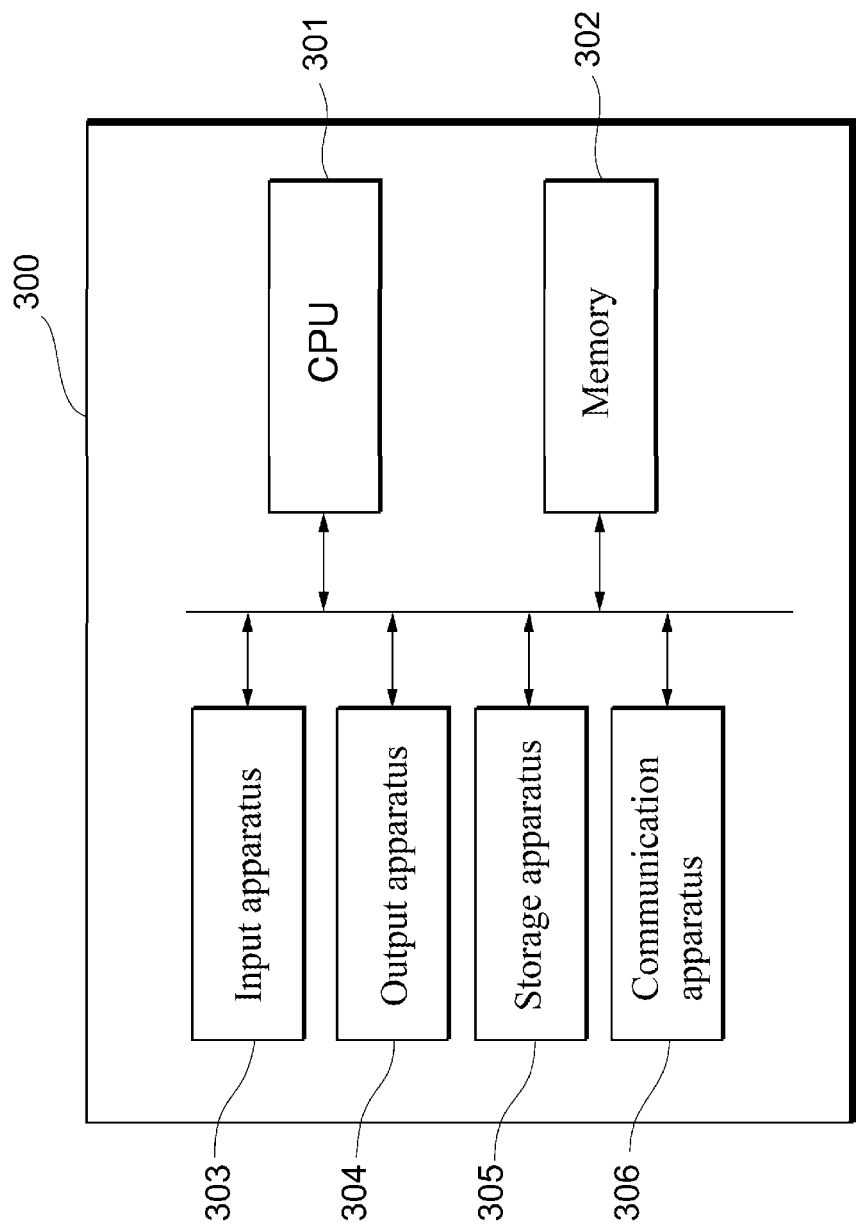
FIG. 2 is a diagram illustrating a hardware configuration of a robot control apparatus.

FIG. 2 is a diagram showing a configuration of the robot control apparatus 300.

The robot control apparatus 300 is constituted by an information processing apparatus such as a personal computer. The robot control apparatus 300 includes a memory 302 such as a RAM or a ROM storing various control programs that are executed by a CPU 301, an input apparatus 303 provided with a keyboard, a mouse, an operation button and the like, an output apparatus provided with a liquid crystal panel and the like, a storage apparatus 305 such as a hard disk, and a communication apparatus 306 provided with communication interfaces.

Figure 3:
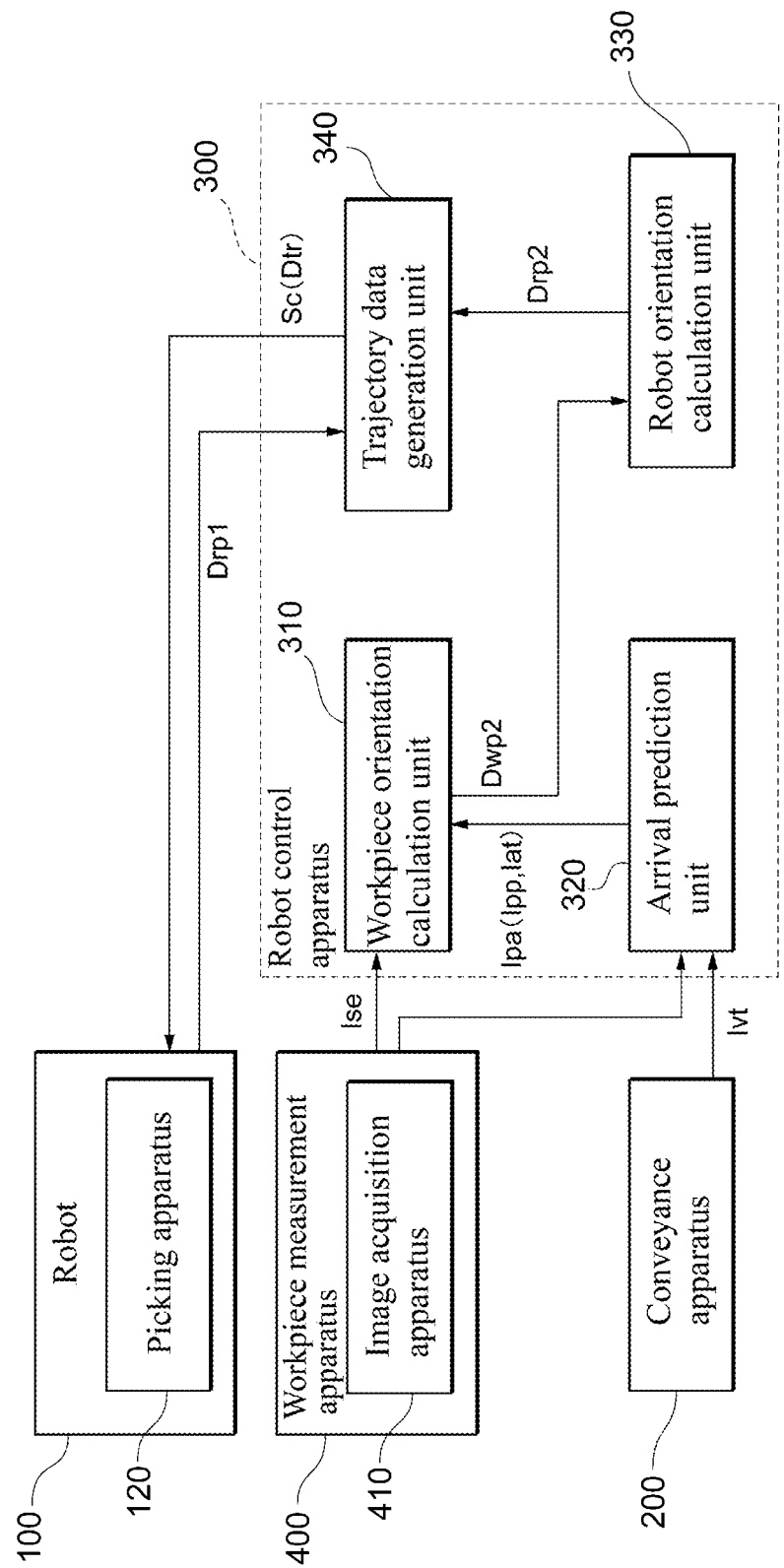
FIG. 3 is a block diagram illustrating a configuration of a robot control apparatus.

FIG. 3 is a block diagram showing a configuration of the robot control apparatus 300.

The robot control apparatus 300 realizes the following units, by the CPU 301 loading and interpreting/executing software stored in the memory 302 or the like.

As shown in FIG. 3, the robot control apparatus 300 includes a workpiece orientation calculation unit 310, an arrival prediction unit 320, a robot orientation calculation unit 330, and a trajectory data generation unit 340.

Workpiece Orientation Calculation Unit

The workpiece orientation calculation unit 310 detects the workpieces W based on sensing information Ise supplied by the workpiece measurement apparatus 400, and obtains orientation data Dwp1 that expresses the orientation at an operation start position (that is, at a position of the workpiece W at the measurement time) of a workpiece W that is to be picked up. Although the case where the workpiece orientation calculation unit 310 detects the workpieces W to be picked up is described as an example in one or more embodiments, instead of this, a configuration is possible in which the workpiece measurement apparatus 400 detects the workpieces W from the image data of the workpieces W and outputs sensing information that expresses coordinate values, a coordinate system, or the like of the workpieces W that are obtained therefrom, and the workpiece orientation calculation unit 310 obtains the orientation data Dwp1 based on the sensing information. On the other hand, orientation Dwp2 expressing the orientation at the picking prediction position of the workpiece W is obtained based on arrival prediction information Ipa of the workpiece W that is output from the arrival prediction unit 320 (specifically, predicted picking prediction position information Ipp expressing the picking prediction position of the workpiece W and arrival prediction time information Iat expressing the arrival prediction time, which will be described), and the orientation data Dwp1 of the workpiece W. When calculating the orientation at the operation start position of the workpiece W to be picked up, the workpiece orientation calculation unit 310 performs matching with CAD models (model data). Specifically, the matching operation with the CAD models involves, first, registering the CAD models of the workpiece W in a memory of the workpiece orientation calculation unit 310 or the like in advance. The workpiece orientation calculation unit 310 matches the sensing information Ise that is supplied by the workpiece measurement apparatus 400 and the CAD models, and calculates the orientation of the workpiece W utilizing the matching result. Accordingly, the orientation can be calculated with high accuracy, compared to the case where the CAD model of the workpiece W, which serves as a reference, is not used.

Note that an orientation expression using roll, pitch and yaw angles about three rotational axes is used for the orientation of the workpiece W, for example. Also, the workpiece orientation calculation unit 310 calculates the orientation at the picking prediction position of the workpiece W by multiplying the orientation data Dwp1 of the workpiece W at the operation start position by the movement of the workpiece W in the directions of the XYZ axes to the picking prediction position and the rotation amounts about the XYZ axes (roll, pitch, and yaw angles), and obtains the orientation data Dwp2.

Also, if, in the case where the orientation of the workpiece W changes during movement, the change amount of the orientation of the workpiece W is known in advance, it is possible to provide the change amount of the orientation as offset. As described above, when obtaining the orientation data Dwp1 at the operation start position of the workpiece W and the orientation data Dwp2 at the picking prediction position of the workpiece W, the workpiece orientation calculation unit 310 outputs the orientation data Dwp2 at the picking prediction position to the robot orientation calculation unit 330. Also, although the case where the workpiece orientation calculation unit 310 obtains the orientation data Dwp1 expressing the orientation at the operation start position of the workpiece W to be picked up is described as an example in one or more embodiments, instead of this, a configuration is possible in which the workpiece measurement apparatus 400 calculates the orientation data Dwp1 and outputs, to the workpiece orientation calculation unit 310, the calculated orientation data Dwp1 together with sensing information that expresses the position, distance, and the like of the workpiece W.

Arrival Prediction Unit

The arrival prediction unit 320 obtains a position (also referred to as "picking prediction position" hereinafter) at which the workpiece W that is conveyed by the conveyance apparatus 200 may be picked up by the picking apparatus 120 (that is, robot hand), the time (also referred to as "arrival prediction time") at which the workpiece W may arrive at the picking prediction position, and the like, based on information (also referred to as "conveyance speed information" hereinafter) Ivt expressing a conveyance speed that is supplied by the conveyance apparatus 200 or the like and the sensing information Ise that is supplied by the image acquisition apparatus 410. A picking prediction position can be set in a range of a radius of Y m with an angle of X degrees left and right from the front center of the robot 100 as one example of the picking prediction position, but it is not intended to limit the picking prediction position thereto, and the picking prediction position may be set as appropriate with consideration for the layout design of a factory and the like. When obtaining the picking prediction position and the arrival prediction time of the workpiece W, the arrival prediction unit 320 outputs the predicted picking prediction position information Ipp expressing the picking prediction position of the workpiece W and the predicted arrival prediction time information Iat expressing the arrival prediction time, to the workpiece orientation calculation unit 310 as the arrival prediction information Ipa of the workpiece W.

Robot Orientation Calculation Unit

The robot orientation calculation unit 330 calculates the orientation at the picking prediction position of the robot 100 based on the orientation data Dwp2 at the picking prediction position of the workpiece W that is supplied by the workpiece orientation calculation unit 310. When calculating the orientation at the picking prediction position of the robot 100, the robot orientation calculation unit 330 outputs the calculation result to the trajectory data generation unit 340 as orientation data Drp2 at the picking prediction position of the robot 100. Note that although the case where the workpiece orientation calculation unit 310 obtains the orientation data Dwp2 at the picking prediction position of the workpiece W is described as an example in one or more embodiments, a configuration is possible in which the robot orientation calculation unit 330 obtains the orientation data Dwp2 at the picking prediction position of the workpiece W using the arrival prediction information Ipa of the workpiece W that is supplied by the arrival prediction unit 320 and the orientation data Dwp1 at the operation start position of the workpiece W that is supplied by the work orientation calculation unit 310.

Trajectory Data Generation Unit

The trajectory data generation unit 340 generates trajectory data Dtr of the robot 100 based on orientation data Drp1 expressing the orientation at the operation start position of the robot 100 that is supplied by the robot 100 and the orientation data Drp2 expressing the orientation at the picking prediction position that is supplied by the robot orientation calculation unit 330. Herein, the trajectory data Dtr of the robot 100 is data expressing information on the trajectory extending from the operation start position of the robot 100 to the predicted picking prediction position. Information on the trajectory can be obtained by determining an initial state of the robot 100 at the operation start position based on the orientation of the robot 100 and calculating a trajectory extending from this initial state to the picking prediction position. When generating the trajectory data Dtr, the trajectory data generation unit 340 outputs the generated trajectory data Dtr to the robot 100 a control signal Sc for controlling the operation of the robot 100. The robot 100 performs operation of the arm 110 and joints and the opening/closing operation of the picking apparatus 120 in accordance with the control signal Sc that is output from the trajectory data generation unit 340.

A-2. Operation

Figure 4:
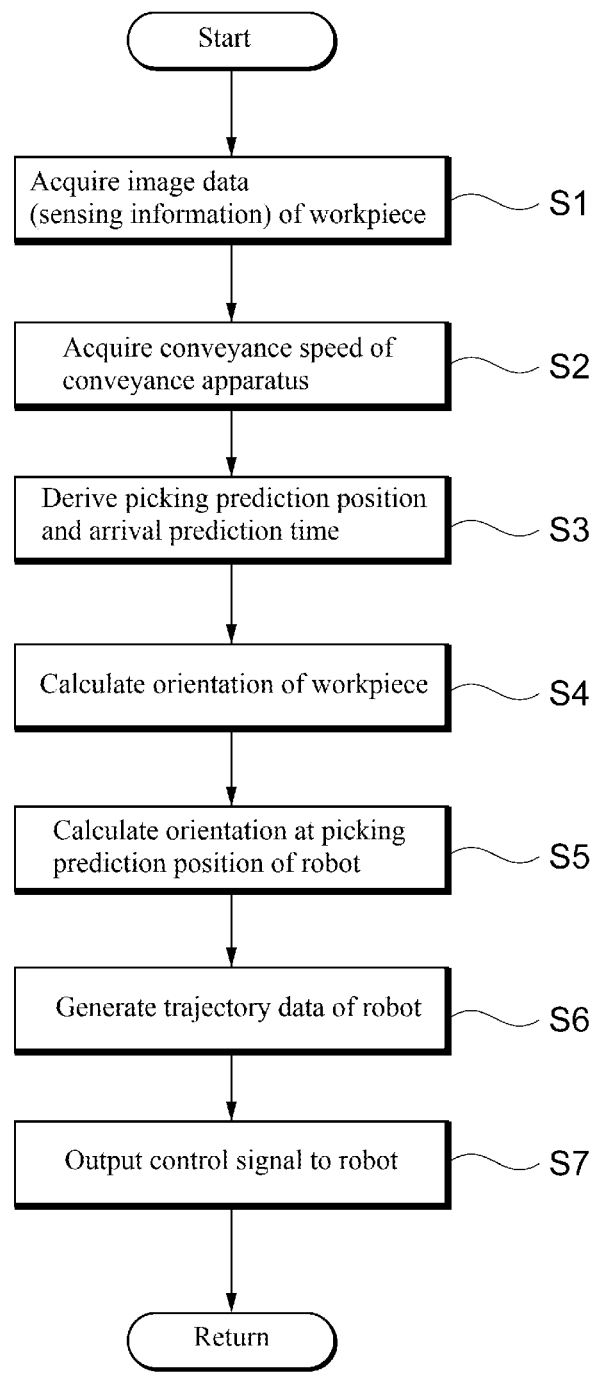
FIG. 4 is a flowchart illustrating robot control processing.

FIG. 4 is a flowchart showing robot control processing executed by the robot control apparatus 300 according to one or more embodiments.

When acquiring the image data (sensing information) of the workpiece W from the workpiece measurement apparatus 400 (step S1), the robot control apparatus 300 first acquires the conveyance speed of the conveyance apparatus 200 (step S2). Specifically, the arrival prediction unit 320 of the robot control apparatus 300 acquires the conveyance speed of the conveyance apparatus 200 based on conveyance speed information Ivt that is supplied by the conveyance apparatus 200. Furthermore, the arrival prediction unit 320 receives the sensing information Ise from the workpiece measurement apparatus 400, and obtains the picking prediction position and the arrival prediction time of the workpiece W based on the received sensing information Ise and the acquired conveyance speed (step S3). Then, the arrival prediction unit 320 outputs the picking prediction position information Ipp expressing the predicted picking prediction position of the workpiece W, and the arrival prediction time information Iat expressing the arrival prediction time to the workpiece orientation calculation unit 310 as the arrival prediction information Ipa of the workpiece W. Also, although the arrival prediction information Ipa of the workpiece W is output to the workpiece orientation calculation unit 310 in one or more embodiments, the robot orientation calculation unit 330 can calculate the orientation data Dwp2 expressing the orientation at the picking prediction position of the workpiece W, and in this case, the arrival prediction information Ipa is output to the robot orientation calculation unit 330.

On the other hand, the workpiece orientation calculation unit 310 detects the workpiece W based on the sensing information Ise that is supplied by the workpiece measurement apparatus 400 and obtains the orientation data Dwp1 expressing the orientation at the operation start position of the workpiece W to be picked up, whereas the workpiece orientation calculation unit 310 obtains the orientation data Dwp2 expressing the orientation at the picking prediction position of the workpiece W based on the arrival prediction information Ipa of the workpiece W that is output from the arrival prediction unit 320 (that is, the picking prediction position information Ipp expressing the predicted picking prediction position of the workpiece W and the arrival prediction time information Iat expressing the arrival prediction time) and the orientation data Dwp1 of the workpiece W (step S4). The workpiece orientation calculation unit 310 outputs the obtained orientation data Dwp2 of the workpiece W to the robot orientation calculation unit 330.

The robot orientation calculation unit 330 calculates the orientation at the picking prediction position of the robot 100 based on the orientation data Dwp2 at the picking prediction position of the workpiece W that is supplied by the workpiece orientation calculation unit 310 (step S5). When calculating the orientation at the picking prediction position of the robot 100, the robot orientation calculation unit 330 outputs the calculation result to the trajectory data generation unit 340 as the orientation data Drp2 at the picking prediction position of the robot 100.

The trajectory data generation unit 340 generates the trajectory data Dtr of the robot 100 based on the orientation data Drp1 expressing the orientation at the operation start position of the robot 100 that is supplied by the robot 100 and the orientation data Drp2 expressing the orientation at the picking prediction position that is supplied by the robot orientation calculation unit 330 (step S6), and outputs the generated trajectory data Dtr to the robot 100 as the control signal Sc (step S7). The robot 100 performs operation of the arm 110 and joints and an opening/closing operation of the picking apparatus 120 in accordance with the control signal Sc that is output from the trajectory data generation unit 340, and transfers the workpiece W that is moving on the conveyance apparatus 200 to a predetermined position on the shelf D. The above-described series of processes are repeatedly executed on each workpiece W by the robot control apparatus 300. By executing such robot control processing, it becomes possible to transfer the workpieces W on the conveyance apparatus 200 to predetermined positions on the shelf D without stopping the conveyance apparatus 200.

B. Modification

B-1. Configuration

Figure 5:
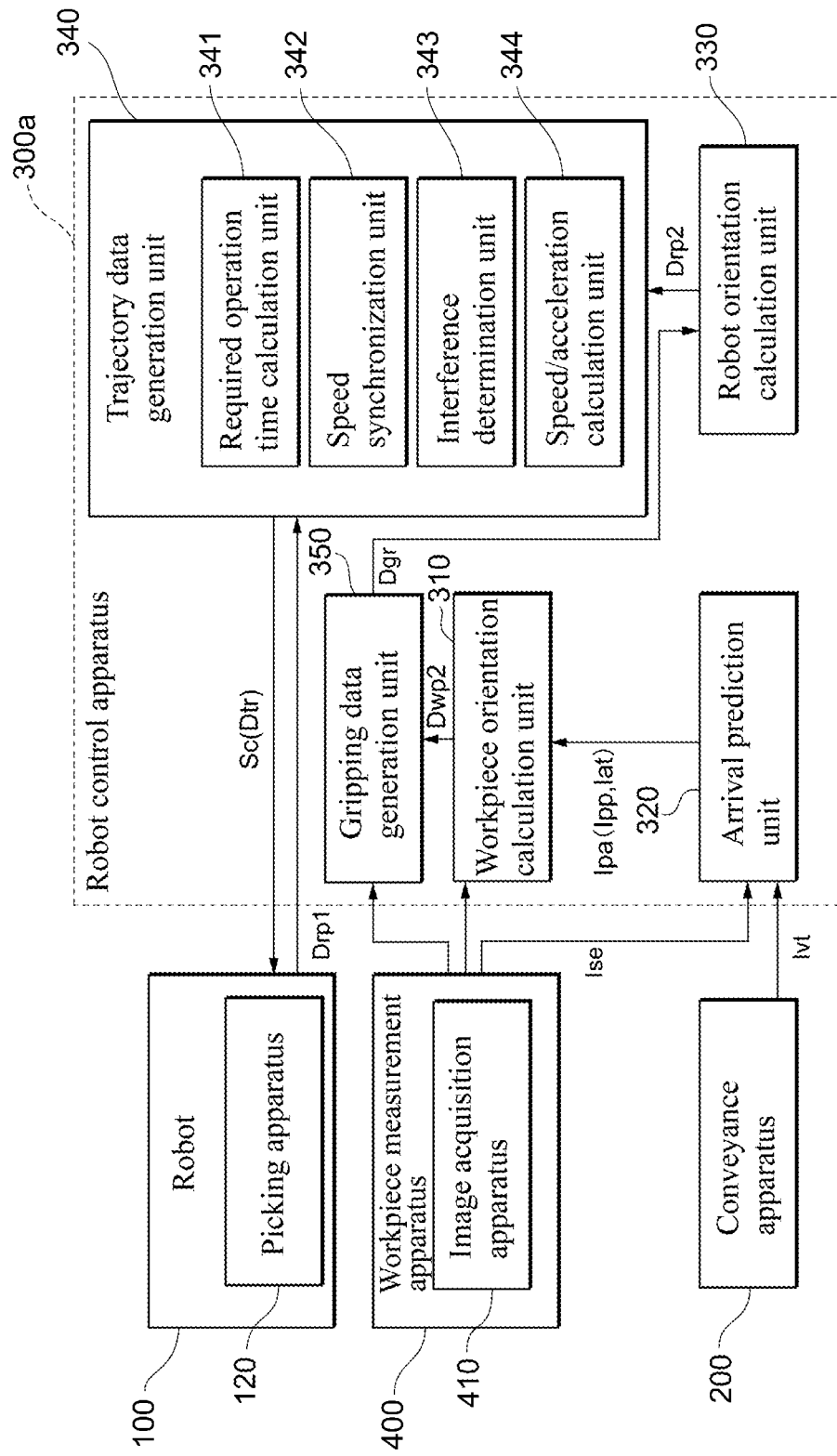
FIG. 5 is a block diagram illustrating a configuration of a robot control apparatus according to a modification.

FIG. 5 is a block diagram showing a configuration of a robot control apparatus 300a according to a modification. The hardware configuration of the robot control apparatus 300a shown in FIG. 5 is similar to that of the robot control apparatus 300 according to one or more embodiments. Note that the robot control apparatus 300a is different from the robot control apparatus 300 according to one or more embodiments in that the robot control apparatus 300a includes a required operation time calculation unit 341, a speed synchronization unit 342, an interference determination unit 343, a speed/acceleration calculation unit 344, and a gripping data generation unit 350. The other configurations are similar to those of the robot control apparatus 300 shown in FIG. 3, and thus the corresponding parts are given the same reference numerals, and detailed description thereof will be omitted. Note that, similarly to the robot control apparatus 300, the robot control apparatus 300a also realizes the units shown in FIG. 5, by the CPU 301 loading and interpreting/executing software stored in the memory 302 or the like.

Required Operation Time Calculation Unit

The required operation time calculation unit 341 calculates a required operation time of the robot 100 that is required from the current position of the robot to the picking prediction position of the workpiece W based on the above-described orientation data Drp1 and Drp2 of the robot 100 and the like. The trajectory data generation unit 340, by taking into consideration the required operation time that is calculated by the required operation time calculation unit 341, can calculate the trajectory data Dtr with no delay, with respect to the movement of the workpiece W (that is, with respect to the conveyance of the workpiece W until the workpiece is picked up by the robot 100).

Speed Synchronization Unit

The speed synchronization unit 342 performs control for synchronizing the conveyance speed of the conveyance apparatus 200 and the operation speed of the robot 100 after the picking apparatus (robot hand) 120 arrives at the workpiece W (that is, control for making the relative speed thereof 0). Specifically, after the robot hand 120 arrives at the workpiece W, the speed synchronization unit successively detects a difference between the conveyance speed of the conveyance apparatus 200 and the operation speed of the robot hand 120 using a synchronization encoder or the like, and controls the operation of the conveyance apparatus 200 and the operation of the robot hand 120 such that the difference becomes zero. By synchronizing the conveyance speed of the conveyance apparatus 200 and the operation speed of the robot 100 after the robot hand 120 arrives at the picking prediction position, the picking apparatus 120 is capable of stably performing the picking up operation on the workpiece W. Note that if the conveyance speed and the operation speed become equal to each other before the robot hand 120 arrives at the workpiece W, the robot hand 120 may be operated at the equal speed in accordance with the conveyance speed of the conveyance apparatus 200.

Interference Determination Unit

The interference determination unit (constraint condition determination unit) 343 determines whether or not the motion (trajectory) of the robot 100 will result in interference with an obstacle based on the trajectory data generated by the trajectory data generation unit 340, based on two concepts (1) and (2) below.

(1) Data of a trajectory that does not collide with an obstacle is generated by performing interference determination every time a trajectory is partially generated and connecting trajectories that do not result in interference.

(2) Trajectory determination is performed on the entire trajectory from the operation start position of the robot 100 to the predicted picking prediction position, and this trajectory is adopted as trajectory data if interference does not occur.

If the interference determination unit 343 determines that the robot 100 does not collide with an obstacle, the trajectory data generation unit 340 generates the trajectory data Dtr of the robot 100, and outputs the generated trajectory data Dtr as the control signal Sc to the robot 100. Accordingly, the problem of the robot 100 colliding with an obstacle during the picking up operation can be prevented in advance. Note that although interference of an obstacle with the robot 100 was described as one example of a constraint condition in the present modification, it is not intended to limit the constraint conditions thereto. In addition, generation of the trajectory of the robot 100 in the motion range thereof, taking into consideration the speed/acceleration that the robot 100 is capable of, or the like may be set as one constraint condition.

Speed/Acceleration Calculation Unit

When the trajectory data generation unit 340 generates the trajectory data Dtr, the speed/acceleration calculation unit 344 reflects an optimal speed/acceleration of the joints of the robot 100 in the trajectory data Dtr of the robot 100. The speed/acceleration of the joints are optimized broadly from two points of view. One point of view is the case where the motion of the robot 100 changes (motion change points), with smooth motion of the joints of the robot 100 being realized through trapezoidal control of speed or the like. The other point of view is the case where the workpiece W is gripped, with reliable gripping of the workpiece W by the robot 100 being realized by slowly moving the joints of the robot 100.

Gripping Data Generation Unit

The gripping data generation unit 350 generates gripping data such as positions and angles for the picking apparatus (robot hand) 120 to stably grip the workpiece W. The gripping data generation unit 350 executes a gripping plan based on the sensing information Ise supplied by the workpiece measurement apparatus 400, information expressing the weight and friction of the workpiece W, and the like, selects an optimal gripping point, for example, and generates gripping data Dgr for gripping the workpiece W at the optimal gripping point. Herein, the gripping plan refers to a planning problem that requires the configuration of the robot hand 120 that can stably grip the workpiece W when the position and the orientation of the workpiece W are provided, and the gripping point refers to the position and the orientation of the robot hand 120 in the hand coordinate system during execution of gripping. When generating the gripping data Dgr, the gripping data generation unit 350 outputs the generated gripping data Dgr to the robot orientation calculation unit 330. By selecting the gripping position based on the gripping plan and determining the position and the angle of the picking apparatus 120 that holds the workpiece W in this manner, stable picking up operation is possible. Note that the gripping data generation unit 350 may be provided in the workpiece measurement apparatus 400.

B-2. Operation

Figure 6:
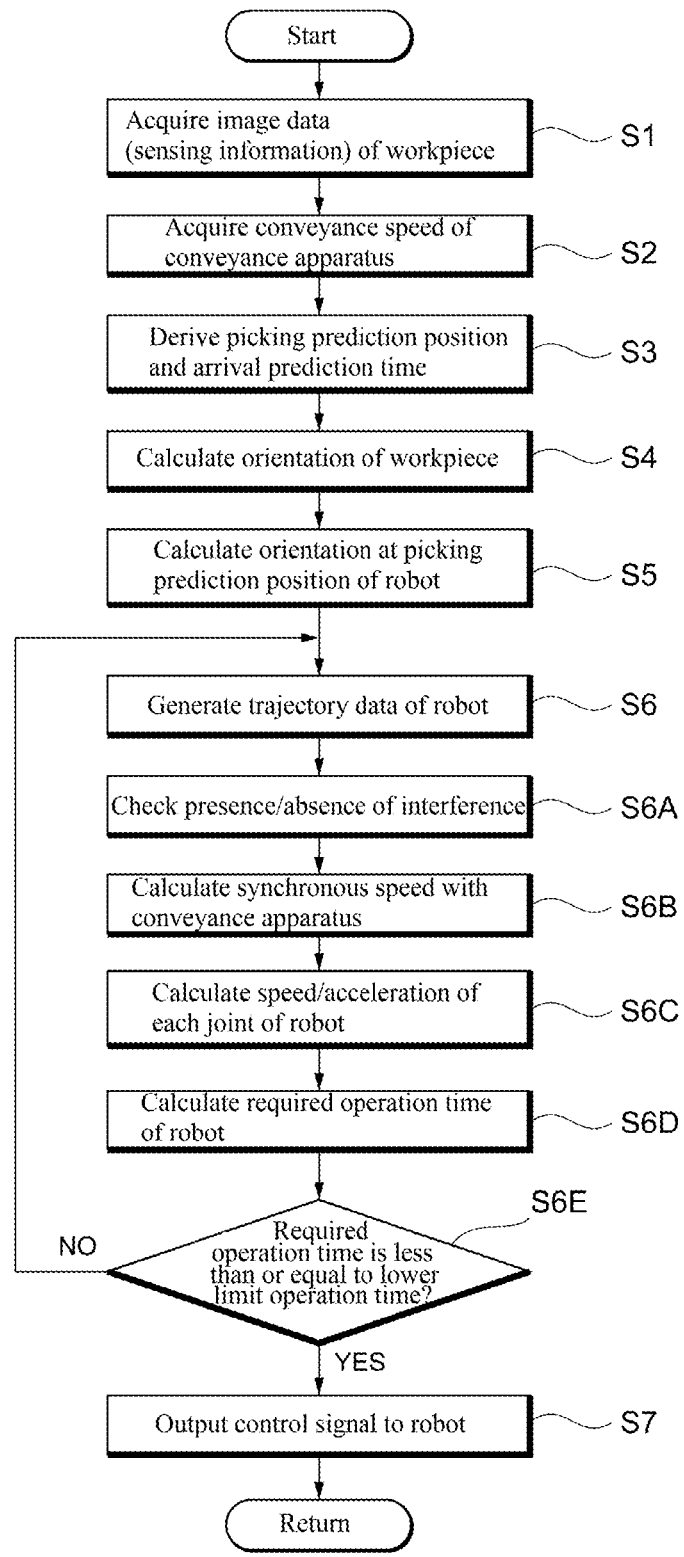
FIG. 6 is a flowchart illustrating robot control processing according to a modification.

FIG. 6 is a flowchart showing robot control processing executed by the robot control apparatus 300 according to a modification. Note that steps corresponding to the robot control processing shown in FIG. 4 are given the same reference numerals, and detailed description thereof will be omitted.

When acquiring the image data of the workpiece W from the workpiece measurement apparatus 400 (step S1), the robot control apparatus 300 first acquires the conveyance speed of the conveyance apparatus 200 (step S2). Specifically, the arrival prediction unit 320 of the robot control apparatus 300 acquires the conveyance speed of the conveyance apparatus 200 based on conveyance speed information Ivt that is supplied by the conveyance apparatus 200. Furthermore, the arrival prediction unit 320 receives the sensing information Ise from the workpiece measurement apparatus 400, and obtains the picking prediction position and the arrival prediction time of the workpiece W based on the received sensing information Ise and the acquired conveyance speed (step S3). Then, the arrival prediction unit 320 outputs the picking prediction position information Ipp expressing the predicted picking prediction position of the workpiece W, and the arrival prediction time information Iat expressing the arrival prediction time to the workpiece orientation calculation unit 310 as the arrival prediction information Ipa of the workpiece W. Also, although the arrival prediction information Ipa of the workpiece W is output to the workpiece orientation calculation unit 310 in the present modification, the robot orientation calculation unit 330 can calculate the orientation data Dwp2 expressing the orientation at the picking prediction position of the workpiece W, and in this case, the arrival prediction information Ipa of the workpiece W is output to the robot orientation calculation unit 330.

On the other hand, the workpiece orientation calculation unit 310 detects the workpiece W based on the sensing information Ise that is supplied by the workpiece measurement apparatus 400 and obtains the orientation data Dwp1 expressing the orientation at the operation start position of the workpiece W to be picked up, whereas the workpiece orientation calculation unit 310 obtains the orientation data Dwp2 expressing the orientation at the picking prediction position of the workpiece W based on the arrival prediction information Ipa of the workpiece W that is output from the arrival prediction unit 320 (that is, the picking prediction position information Ipp expressing the predicted picking prediction position of the workpiece W and the arrival prediction time information Iat expressing the arrival prediction time) and the orientation data Dwp1 of the workpiece W (step S4). The workpiece orientation calculation unit 310 outputs the obtained orientation data Dwp2 of the workpiece W to the gripping data generation unit 350.

The gripping data generation unit 350 executes a gripping plan based on the orientation data Dwp2 at the picking prediction position of the workpiece W that is supplied by the workpiece orientation calculation unit 310, the sensing information Ise supplied by the workpiece measurement apparatus 400, information expressing the weight and friction of the workpiece W, and the like, selects an optimal gripping point, and generates the gripping data Dgr for gripping the workpiece W at the optimal gripping point. The gripping data generation unit 350 outputs the generated gripping data Dgr to the robot orientation calculation unit 330.

The robot orientation calculation unit 330 calculates the orientation of the robot 100 at the picking prediction position of the robot based on the gripping data Dgr that is output from the gripping data generation unit 350 (step S5). The robot orientation calculation unit 330 then outputs the calculation result to the trajectory data generation unit 340 as the orientation data Drp2 at the picking prediction position of the robot 100. The trajectory data generation unit 340 generates trajectory data Dtr of the robot 100 based on the orientation data Drp1 expressing the orientation at the operation start position of the robot 100 that is supplied by the robot 100 and the orientation data Drp2 expressing the orientation at the picking prediction position that is supplied by the robot orientation calculation unit 330 (step S6).

The interference determination unit 343 determines whether or not the motion (trajectory) of the robot 100 will result in interference with an obstacle based on the trajectory data generated by the trajectory data generation unit 340, (step S6A). If the interference determination unit 343 confirms that no interference occurs between the robot 100 and an obstacle, when the trajectory data generation unit 340 generates the trajectory data Dtr, the speed synchronization unit 342 calculates a synchronous speed such that the conveyance speed of the conveyance apparatus 200 and the operation speed of the robot 100 are synchronized after the picking apparatus (robot hand) 120 arrives at the workpiece W (step S6B).

On the other hand, when the trajectory data generation unit 340 generates the trajectory data Dtr, the speed/acceleration calculation unit 344 calculates an optimal speed/acceleration of the joints of the robot 100 (step S6C). Furthermore, a required operation time calculation unit 341 calculates a required operation time of the robot 100 that is required from the current position of the robot to the picking prediction position of the workpiece W based on the orientation data Drp1 and Drp2 of the robot 100 (step S6D). The required operation time calculation unit 341 then determines whether or not the obtained required operation time is within a lower limit operation time (set time) Tmin (step S6E). When it is determined that the obtained operation time exceeds the lower limit operation time Tmin (step S6E: NO), the required operation time calculation unit 341 returns to step S6 and repeats the above-described series of processes in order to again generate the trajectory data Dtr of the robot 100.

On the other hand, when it is determined that the obtained required operation time is within the lower limit operation time Tmin (step S6E: YES), the required operation time calculation unit 341 instructs the trajectory data generation unit 340 to output the trajectory data Dtr. The trajectory data generation unit 340 outputs the trajectory data Dtr generated in step S6 to the robot 100 as the control signal Sc in accordance with the instruction issued by the required operation time calculation unit 341 (step S7). The robot 100 performs operation of the arm 110 and joints and the opening/closing operation of the picking apparatus 120 in accordance with the control signal Sc that is output from the trajectory data generation unit 340, and transfers the workpiece W that is moving on the conveyance apparatus 200 to a predetermined position on the shelf D. The operation plan of the robot 100 may be optimized with consideration for the presence/absence of an obstacle, the speed/acceleration of the robot 100, and the required operation time of the robot 100. Note that it is sufficient that the above-described lower limit operation time Tmin is calculated in advance based on the conveyance speed at which the conveyance apparatus 200 conveys the workpiece W or the like, for example, and the calculated lower limit operation time Tmin is set in the required operation time calculation unit 341. Of course, a configuration is possible in which a line operator or the like can set and modify the lower limit operation time Tmin as appropriate.

C. Application Examples

Figure 7:
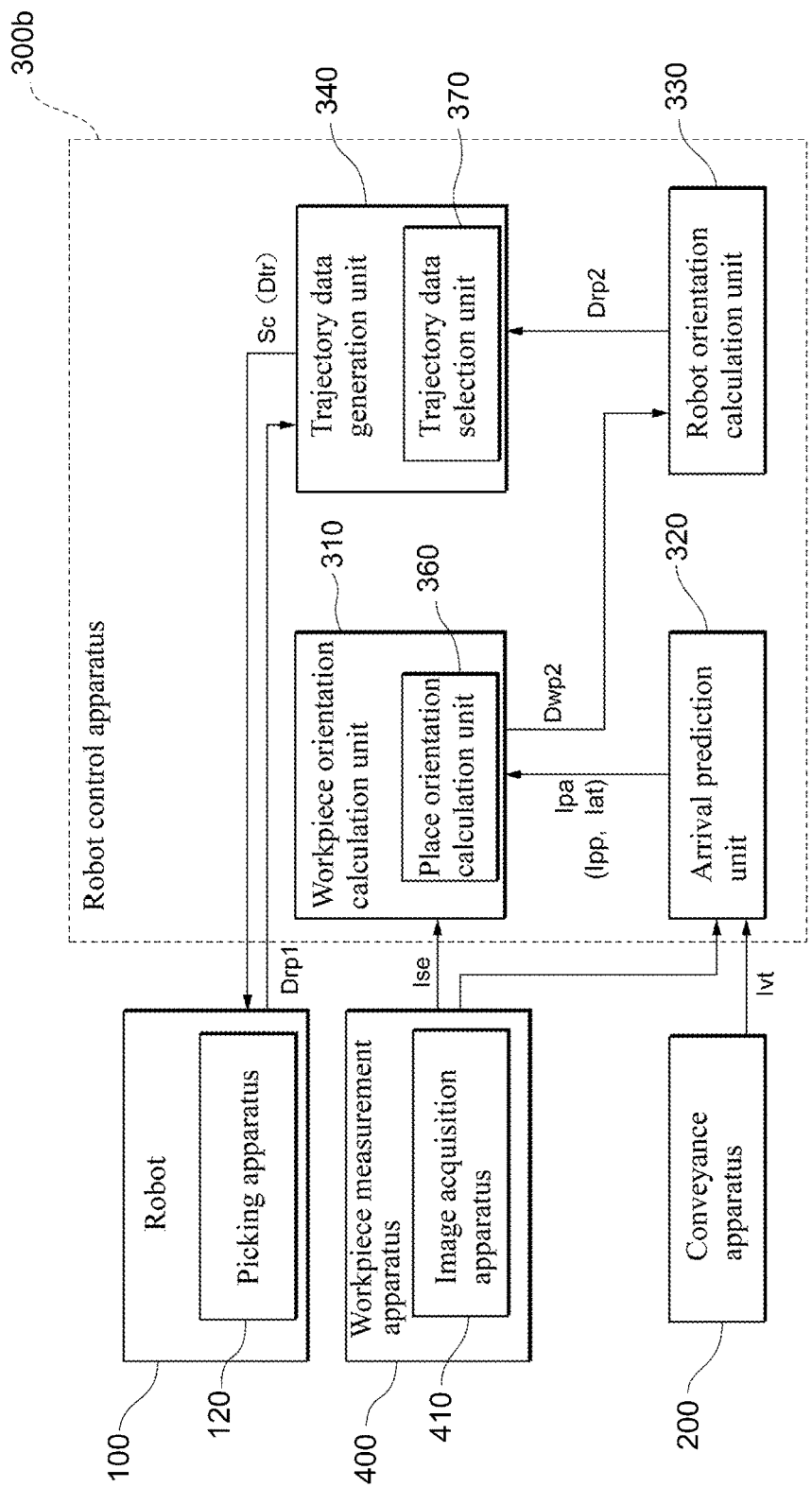
FIG. 7 is a block diagram illustrating a configuration of a robot control apparatus according to an application example.

Herein, FIG. 7 is a block diagram showing a configuration of a robot control apparatus 300b according to an application example. The hardware configuration of the robot control apparatus 300b shown in FIG. 7 is similar to that of the robot control apparatus 300 according to one or more embodiments. However, the robot control apparatus 300b is different from the robot control apparatus 300 according to one or more embodiments in that the robot control apparatus 300b includes a place orientation calculation unit 360 and a trajectory data selection unit 370. The other configurations are similar to those of the robot control apparatus 300 shown in FIG. 3, and thus the corresponding parts are given the same reference numerals, and detailed description thereof will be omitted. Note that similarly to the robot control apparatus 300, the robot control apparatus 300b also realizes the units shown in FIG. 7, by the CPU 301 loading and interpreting/executing software stored in the memory 302 or the like.

Place Orientation Calculation Unit

The place orientation calculation unit 360 calculates the orientation of the workpiece W when the robot 100 places the workpiece W that was picked up on the shelf D or at a predetermined position of the conveyance apparatus 200. Adopting such a configuration makes it possible to place the workpieces W transferred by the robot 100 on the shelf D or on a tray or in a box placed on the conveyance apparatus 200 in an aligned state. Note that the orientation of the workpieces W when placed can be calculated utilizing the sensing information Ise that is output from a workpiece measurement apparatus 400 and information relating to the placing of the workpieces W that is input from various other sensors or the like.

Trajectory Data Selection Unit

The trajectory data selection unit 370 selects trajectory data Dtr optimal for picking up from among a plurality of pieces of the trajectory data Dtr generated by the trajectory data generation unit 340, based on a prediction position and the time at which the robot arrives at the workpiece W, the speed and the acceleration that can be applied to the robot 100, or the like. This makes it possible to generate an optimal path plan. Note that this mode is premised on the trajectory data generation unit 340 generating a plurality of pieces of trajectory data Dtr for one workpiece W or generating a plurality of pieces of trajectory data Dtr for a plurality of workpieces W.

Note that the robot 100 may be a mobile robot (for example, an automated guided robot that moves after creating its own map, for example), a robot installed in an automated guided vehicle (AGV), and a multi-jointed robot combined coaxially in the XYZ directions. In such a case, it is sufficient that the trajectory data generation unit 340 generates not only trajectory data of the robot 100 that picks the workpiece W but also trajectory data of the mobile robot or the automated guided vehicle. Accordingly, the robot 100 can pick up the workpiece W at any location.

Also, although a physical robot 100 is caused to perform the picking up operation in one or more embodiments, it is not intended to limit the present invention thereto, and a configuration is possible in which a robot on a simulator is caused to perform the picking up operation. In this manner, the picking up operation by a virtual robot may be simulated without actually moving a robot.

D. Other Embodiments

Although the case where the plurality of workpieces W are accommodated in the case C was described as an example in one or more embodiments and the like above, various types of container (a space saving container and a stocker, for example) and the like may be used. Due to the workpiece W being accommodated in a container, the orientation of the workpiece W readily changes to an arbitrary orientation.

The conveyance apparatus 200 may be a mobile robot, an automated guided vehicle, a movable stage, and the like, in addition to a conveyor. Utilization of a mobile robot or an automated guided vehicle as the conveyance apparatus makes it possible to convey the workpieces W to any locations.

The workpiece measurement apparatus 400 may be a three-dimensional distance image sensor, or have a configuration in which an image sensor and a distance sensor are combined, in addition to the image sensor. Use of a three-dimensional distance image sensor or the like makes it possible to obtain the position, shape, inclination, and the like of the workpiece W with higher accuracy.

The picking apparatus 120 may be an adsorption apparatus, in addition to hand apparatuses such as a parallel hand, a multi-fingered hand, and a multi-fingered, multi-jointed hand. That is, various picking apparatuses configured to hold the workpiece W can be utilized.

Herein, when calculating the orientation at the operation start position of the workpiece W to be picked up, the workpiece orientation calculation unit 310 may perform matching with data created from the measurement result, or a pattern using a 2D sensor, instead of performing matching with CAD models (model data). Furthermore, matching between the sensing information Ise of the workpiece W and the model data may be performed by performing matching with the CAD models in the workpiece measurement apparatus 400, instead of being performed in the workpiece orientation calculation unit 310.

Also, the arrival prediction unit 320 may utilize an encoder value, a rotational speed, or the like of the conveyor that is supplied by the conveyance apparatus 200 when the picking prediction position information Ipp expressing the picking prediction position of the workpiece W, the orientation data Dwp2 expressing the orientation at the picking prediction position of the workpiece W and the arrival prediction time information Iat expressing the arrival prediction time are generated. Also, by obtaining the movement speed and direction of the workpiece W, the above-described picking prediction position information Ipp, the orientation data Dwp2 at the picking prediction position of the workpiece W, and the arrival prediction time information Iat may be generated. Utilization thereof makes it possible to obtain not only the picking prediction position, the orientation at the picking prediction position of the workpiece W, and the arrival prediction time of the robot at the workpiece W but also the position and the orientation of the workpiece W in any position, the arrival prediction time at this workpiece W, and the like.

Also, when generating the trajectory data Dtr of the robot 100, the trajectory data generation unit 340 may utilize a random sampling method such as RRT (Rapidly-Exploring Random Tree) or PRM (Probabilistic Roadmap Method), or a trajectory optimization method such as CHOMP (Covariant Hamiltonian Optimization for Motion Planning). According to such a mode, it is possible to generate the trajectory data Dtr more quickly. Of course, it is not intended to limit the generation method thereto, the trajectory data Dtr of the robot 100 may be generated utilizing a cell division method or a potential method.

Also, the trajectory data generation unit 340 may have a configuration in which obstacle data (including data for specifying the position and the shape) relating to an obstacle such as the conveyor of the conveyance apparatus 200 or the case C is input to the trajectory data generation unit 340 in advance. By such obstacle data being input thereto in advance, the trajectory data generation unit 340 can generate the trajectory data of the robot 100 that does not collide with an obstacle. Note that a configuration is possible in which obstacle data is generated using various sensors or the like, and the generated obstacle data is output to the trajectory data generation unit 340.

Note that, in this specification, "unit" does not simply mean a physical configuration but also includes the case where processing executed by the "unit" is realized by software. Also, processing executed by one "unit" or apparatus may be realized by two or more physical configurations or apparatuses, or two or more "units" or apparatuses may be realized by one physical means or apparatus.

Also, the order of the processing steps described in this specification may be suitably changed or the processing steps may be executed in parallel, as long as no conflict arises in the processing content.

Moreover, programs that implement the processes described in this specification may be stored in a recording medium. Use of this recording medium allows the above-described programs to be installed in the robot control apparatus 300. Herein, the recording medium storing the above-described program may be a non-transitory recording medium. The non-transitory recording medium is not particularly limited, and may be a recording medium such as a CD-ROM, for example.

Additional Remark 1

A robot control apparatus that includes at least one memory and at least one hardware processor connected to the memory, and is for controlling a robot configured to pick up a workpiece that is conveyed by a conveyance apparatus, in which the hardware processor, by executing a predetermined program stored in the memory, functions as:

a workpiece orientation calculation unit configured to calculate an orientation of the workpiece based on sensing information of the workpiece that is output from a measurement apparatus;

an arrival prediction unit configured to obtain a picking prediction position at which the workpiece that is being conveyed is predicted to be picked up by the robot, based on the sensing information of the workpiece and a conveyance speed of the conveyance apparatus;

a robot orientation calculation unit configured to calculate an orientation at the picking prediction position of the robot based on the calculated orientation of the workpiece and the picking prediction position; and a trajectory data generation unit configured to acquire an orientation at an operation start position of the robot and generate trajectory data expressing an operation trajectory of the robot from the operation start position to the picking prediction position, based on the acquired orientation at the operation start position of the robot and the orientation at the picking prediction position of the robot.

Additional Remark 2

A robot control method for controlling a robot configured to pick up a workpiece that is conveyed by a conveyance apparatus, using at least one hardware processor, in which the hardware processor executes:

calculating an orientation of the workpiece based on sensing information of the workpiece that is output from a measurement apparatus;

obtaining a picking prediction position at which the workpiece that is being conveyed is predicted to be picked up by the robot, based on the sensing information of the workpiece and a conveyance speed of the conveyance apparatus;

calculating an orientation at the picking prediction position of the robot based on the calculated orientation of the workpiece and the picking prediction position; and acquiring an orientation at an operation start position of the robot and generating trajectory data expressing an operation trajectory of the robot from the operation start position to the picking prediction position, based on the acquired orientation at the operation start position of the robot and the orientation at the picking prediction position of the robot.

The invention claimed is:

1. A robot control apparatus for controlling a robot configured to pick up a workpiece that is conveyed by a conveyance apparatus, the robot control apparatus comprising:
   a processor configured with a program to perform operations comprising:
      operation as an arrival prediction unit configured to obtain a picking prediction position at which the workpiece that is being conveyed is predicted to be picked up by the robot, based on sensing information of the workpiece that is output from a measurement apparatus and a conveyance speed of the conveyance apparatus;
      operation as a workpiece orientation calculation unit configured to:
         calculate a first orientation of the workpiece at a start position based on the sensing information of the workpiece, and
         calculate a second orientation of the workpiece at the picking predicted position based on the first orientation of the workpiece and the picking prediction position;
      operation as a robot orientation calculation unit configured to calculate an orientation of the robot at the picking prediction position based on the calculated second orientation of the workpiece and the picking prediction position; and
      operation as a trajectory data generation unit configured to acquire an orientation of the robot at an operation start position of the robot and generate trajectory data expressing an operation trajectory of the robot from the operation start position to the picking prediction position, based on the acquired orientation of the robot at the operation start position of the robot and the orientation of the robot at the picking prediction position.

2. The robot control apparatus according to claim 1, wherein the processor is configured with the program to perform operations
   further comprising operation as a required operation time calculation unit configured to calculate a required operation time of the robot from the operation start position to the picking prediction position, based on the orientation at the operation start position of the robot and the orientation of the robot at the picking prediction position, and
   such that operation as the trajectory data generation unit comprises operation as the trajectory data generation unit that outputs, to the robot, the trajectory data for which it is determined that the required operation time of the trajectory data is within a set time.

3. The robot control apparatus according to claim 1, wherein the processor is configured with the program to perform operations further comprising
   operation as a speed synchronization unit configured to synchronize the conveyance speed of the conveyance apparatus and an operation speed of the robot, after the robot arrives at the picking prediction position.

4. The robot control apparatus according to claim 1, wherein the processor is configured with the program to perform operations further comprising
   operation as a gripping data generation unit configured to generate gripping data for the robot to stably hold the workpiece and including a position and an angle of the robot, based on the sensing information supplied by the measurement apparatus.

5. The robot control apparatus according to claim 1, wherein the processor is configured with the program to perform operations further comprising
   operation as a constraint condition determination unit configured to determine whether interference will occur between the robot and an obstacle during operation of the robot, based on the trajectory data generated by the trajectory data generation unit.

6. The robot control apparatus according to claim 1, wherein the processor is configured with the program to perform operations further comprising
   operation as a speed/acceleration calculation unit configured to calculate a speed and an acceleration of each joint of the robot in at least one of: a case where operation of the robot changes; and a case where the robot holds the workpiece.

7. The robot control apparatus according to claim 1, wherein
   the processor is configured with the program to perform operations such that operation as the workpiece orientation calculation unit comprises operation as the workpiece orientation calculation unit that calculates the first orientation of the workpiece by matching the sensing information of the workpiece that is output from the measurement apparatus and model data of the workpiece.

8. The robot control apparatus according to claim 1, wherein
   the processor is configured with the program to perform operations such that operation as the arrival prediction unit comprises operation as the arrival prediction unit that obtains the picking prediction position using an encoder value and a rotational speed of the conveyance apparatus and a movement speed and a direction of the workpiece, and the sensing information of the workpiece and the conveyance speed of the conveyance apparatus.

9. The robot control apparatus according to claim 1, wherein the processor is configured with the program to perform operations such that operation as the trajectory data generation unit comprises operation as the trajectory data generation unit that generates the trajectory data using a random sampling method or a trajectory optimization method.

10. The robot control apparatus according to claim 1, wherein the processor is configured with the program to perform operations such that operation as the trajectory data generation unit comprises operation as the trajectory data generation unit that generates the trajectory data with which the robot does not collide with an obstacle, by utilizing obstacle data specifying a position and a shape of the obstacle that are input.

11. The robot control apparatus according to claim 1, wherein the processor is configured with the program to perform operations further comprising
operation as a place orientation calculation unit configured to calculate an orientation of the workpiece when the workpiece is placed at a predetermined position, after the robot picks up the workpiece in accordance with the trajectory data.

12. The robot control apparatus according to claim 1, wherein the processor is configured with the program to perform operations
such that operation as the trajectory data generation unit comprises operation as the trajectory data generation unit that generates a plurality of pieces of the trajectory data, and
further comprising operation as a trajectory data selection unit configured to select the trajectory data suitable for picking up from among the plurality of pieces of the trajectory data, based on the picking prediction position.

13. The robot control apparatus according to claim 1, wherein the robot comprises a robot on a simulator.

14. A robot control method for controlling a robot configured to pick up a workpiece that is conveyed by a conveyance apparatus, the robot control method comprising:
obtaining a picking prediction position at which the workpiece that is being conveyed is predicted to be picked up by the robot, based on sensing information of the workpiece that is output from a measurement apparatus and a conveyance speed of the conveyance apparatus;
calculating a first orientation of the workpiece at a start position based on the sensing information of the workpiece that is output from the measurement apparatus;
calculating a second orientation of the workpiece at the picking predicted position based on the first orientation of the workpiece and the picking prediction position;
calculating an orientation of the robot at the picking prediction position based on the calculated second orientation of the workpiece and the picking prediction position; and
acquiring an orientation of the robot at an operation start position of the robot and generating trajectory data expressing an operation trajectory of the robot from the operation start position to the picking prediction position, based on the acquired orientation of the robot at the operation start position of the robot and the orientation of the robot at the picking prediction position.

15. A non-transitory computer-readable storage medium storing a robot control program for causing a computer configured to control a robot configured to pick up a workpiece that is conveyed by a conveyance apparatus to perform operations comprising:
operation as an arrival prediction unit configured to obtain a picking prediction position at which the workpiece that is being conveyed is predicted to be picked up by the robot, based on sensing information of the workpiece that is output from a measurement apparatus and a conveyance speed of the conveyance apparatus;
operation as a workpiece orientation calculation unit configured to:
calculate a first orientation of the workpiece at a start position based on the sensing information of the workpiece, and
calculate a second orientation of the workpiece at the picking predicted position based on the first orientation of the workpiece and the picking prediction position;
operation as a robot orientation calculation unit configured to calculate an orientation of the robot at the picking prediction position based on the calculated second orientation of the workpiece and the picking prediction position; and
operation as a trajectory data generation unit configured to acquire an orientation of the robot at an operation start position of the robot and generate trajectory data expressing an operation trajectory of the robot from the operation start position to the picking prediction position, based on the acquired orientation of the robot at the operation start position of the robot and the orientation of the robot at the picking prediction position.

* * * * *